United States Patent [19]
Dwyer et al.

[11] Patent Number: 5,549,438
[45] Date of Patent: Aug. 27, 1996

[54] UNIVERSAL COVERED TRAILER

[76] Inventors: Benjamin T. Dwyer; Karen K. Dwyer; Aaron P. Dwyer, all of P.O. Box 105, R.R. 1, Alexander, N. Dak. 58831

[21] Appl. No.: 394,736

[22] Filed: Feb. 27, 1995

[51] Int. Cl.⁶ .................................................. B60P 3/10
[52] U.S. Cl. .................. 414/559; 280/414.1; 280/491.2; 296/40; 296/157
[58] Field of Search ......................... 414/559; 280/414.1, 280/482, 491.2, 638, 656, 789, 480.1; 180/906; 296/40, 56, 157, 181, 24.2

[56] References Cited

U.S. PATENT DOCUMENTS

| | | | |
|---|---|---|---|
| 2,541,288 | 2/1951 | Rice | 296/56 X |
| 2,772,912 | 12/1956 | Neff | 280/414.1 X |
| 2,942,744 | 6/1960 | Hall | 414/559 |
| 2,955,874 | 10/1960 | Brindley | 296/40 X |
| 3,091,352 | 5/1963 | Vitable | 414/559 |
| 3,098,674 | 7/1963 | White | 280/414.1 X |
| 3,116,949 | 1/1964 | Muse | 280/414.1 X |
| 3,326,573 | 6/1967 | Neitzey, Jr. | 280/414.1 X |
| 3,348,859 | 10/1967 | Melbye | 280/414.1 X |
| 3,837,509 | 9/1974 | Gladnick | 280/414.1 X |
| 3,848,892 | 11/1974 | Reder | 280/414.1 |
| 4,215,850 | 8/1980 | Haase et al. | 414/559 X |
| 4,767,132 | 8/1988 | Avery | 280/414.1 |
| 4,826,197 | 5/1989 | Heinzen | 280/414.1 |
| 4,869,545 | 9/1989 | Notermann | 296/157 |
| 5,013,206 | 5/1991 | Ernst et al. | 280/414.1 X |

FOREIGN PATENT DOCUMENTS

90447  12/1967  France ................. 280/491.2

*Primary Examiner*—David A. Bucci
*Attorney, Agent, or Firm*—David A. Lingbeck

[57] ABSTRACT

A universal covered trailer comprising a frame with a tongue having retractable extension sections and comprises a housing having a top wall, two side walls, a bottom with a removable floor mountable therein, and a door attached to the top wall and adapted to close over the back of the housing member to enclose the trailer. The trailer also includes a first remote radio control unit comprising a first radio transmitter, first radio receiver, power supply, first switch, first motor, and reel with a first cable wound thereabout to take up the boat in the trailer and to launch the boat from the trailer easily and conveniently without the user having to do so manually. Further, the trailer has another second radio control unit to retract the extension sections of the tongue when they are in an extended position without the user having to do so manually.

4 Claims, 9 Drawing Sheets

UNIVERSAL COVERED TRAILER

BACKGROUND OF THE INVENTION

This invention relates to a universal covered trailer which can be pulled behind a prime mover such as a truck or car and which can be used to store and carry a boat, in particular, or practically any types of carryable items.

Trailers of all types have been known for some time. There are flatbed trailers, other covered trailers, recreational vehicle trailers, and boat trailers. However, there are no trailers which can be used to conveniently store and carry boats or be used to carry most of any types of items such as personal belongings and which can also be conveniently backed down to the water by extending the tongue means and which can load a boat with a remote radio transmitter device.

One known prior art is a TRAILER, U.S. Pat. No. 2,375,754, invented by K. Ballinger, which includes a chassis frame, tongue means attached to the front end of the frame, an arch member for supporting side members of the frame, and means to suspend an end of the boat from the tongue means.

Another known prior art is a BOAT TRAILER, U.S. Pat. No. 2,944,835, invented by G. O. Englhardt et al., which comprises a frame, a channel track, antifriction rollers to support the boat, and a tongue means to move the boat trailer.

Another known prior art is a ROAD TRAILER FOR TRANSPORTING A BOAT, U.S. Pat. No. 4,029,227, invented by J. Martinez, which comprises a longitudinal frame, at least one transverse frame element, and a lifting device for lifting the boat.

None of the prior art discloses a trailer which not only transports a boat but also stores and protects the boat from road hazards such as rocks chipping the exterior of the boat and tar and also the harsh elements of the environment such as the rays of the sun, rain, or even snow or sleet which can damage the body of the boat nor discloses a trailer which allows the user to pull the boat inside the trailer by means of remote control devices rather than by manually operated means such as turning a crank on a winch.

SUMMARY OF THE INVENTION

The present invention relates to a universal covered trailer which comprises a horizontally-disposed frame, a pair of wheels mounted to an axle which is attached to two sleeves which are slidably mounted to the frame, a housing member fixedly mounted upon the frame and having a top wall, two side walls, a door, hinged or sliding on rollers for opening and closing the housing member, a telescoping tongue means capable of retracting by means of a radio remote control, and a radio remote controlled boat take-up means for urging and securing the boat in the housing member.

One objective of the present invention is to provide a universal covered trailer which is adapted to both conveniently transport and store a boat so that the boat is protected from the elements of the environment.

Another objective of the present invention is to provide a universal covered trailer which allows the user to extend and retract the tongue means by a radio remote control means without the user having to manually operate a crank to extend or retract the tongue means.

Also, another objective of the present invention is to provide a universal covered trailer which allows the user to load and secure a boat in the housing member also by a radio remote control means without the user having to get out of the boat.

Further, another objective of the present invention is to provide a universal covered trailer which has a removable floor for carrying and transporting movable objects other than a boat.

Yet, another objective of the present invention is to provide a universal covered trailer which has an axle slidably mounted on the frame, which can be selectively adjusted to allow the user to back the trailer into the water without the wheels encountering hazards in the water.

Further objects and advantages of the present invention will become apparent as the description proceeds and when taken in conjunction with the accompanying drawings wherein:

DETAILED DESCRIPTION OF THE INVENTION

Referring to the drawings in FIGS. 1–10, in particular, the universal covered trailer 10 comprises a frame 12 having at least four longitudinal members 13a–d spaced apart and interconnected by four transverse members 14a–d which are spaced along the longitudinal members 13a–d, the frame 12 further having two elongate converging members 15a–b having ends fixedly attached to the front ends of the two outside longitudinal members 13a & 13d and extending forward thereof and fixedly attached to one another. A conventional telescoping tongue means 26 having a plurality of lockable tubular sections 27, 28, & 29 which include an anchor section 27 fixedly attached or welded at the articulated joint of the two converging members 15a–b, a first lockable extension section 28 having an area smaller than that of the anchor section 27 and being conventionally extendable from and retractable within the anchor section 27 and further having a stop member (not shown) at an end of the first extension section 28 to prevent the first extension section 28 from completely separating from the anchor section 27, and a second extension section 29 having an area smaller than that of the first extension section 28 and being conventionally extendable from and retractable within the first extension section 28 and also having a stop member (not shown) at an end of the second extension section 29 to prevent the second extension member 29 from completely separating from the first extension section 28. A conventional coupling means 30 is fixedly attached to the end of the second extension section 29 for connecting to a hitch or the like on a prime mover.

The frame 12 is mounted upon an axle 21 which has two wheels 22 & 23 rotatably mounted at the ends thereof. The axle 21 is fixedly fastened or welded to a pair of sleeves 16a–b slidably mounted upon two elongate sleeve supports 20a–b. The axle 21 is capable of sliding along the length of the frame 12 to allow the user the capability of backing the rear end of the trailer 10 into the water with the wheels 22 & 23 being slid forward relative to the frame 12 so that the wheels 22 & 23 do not encounter hazards in the water such as dropoffs. The sleeves 16a–b are adapted to fittingly and slidably mount about the sleeve supports 20a–b and are capable of sliding longitudinally of the frame 12.

Figure 1:
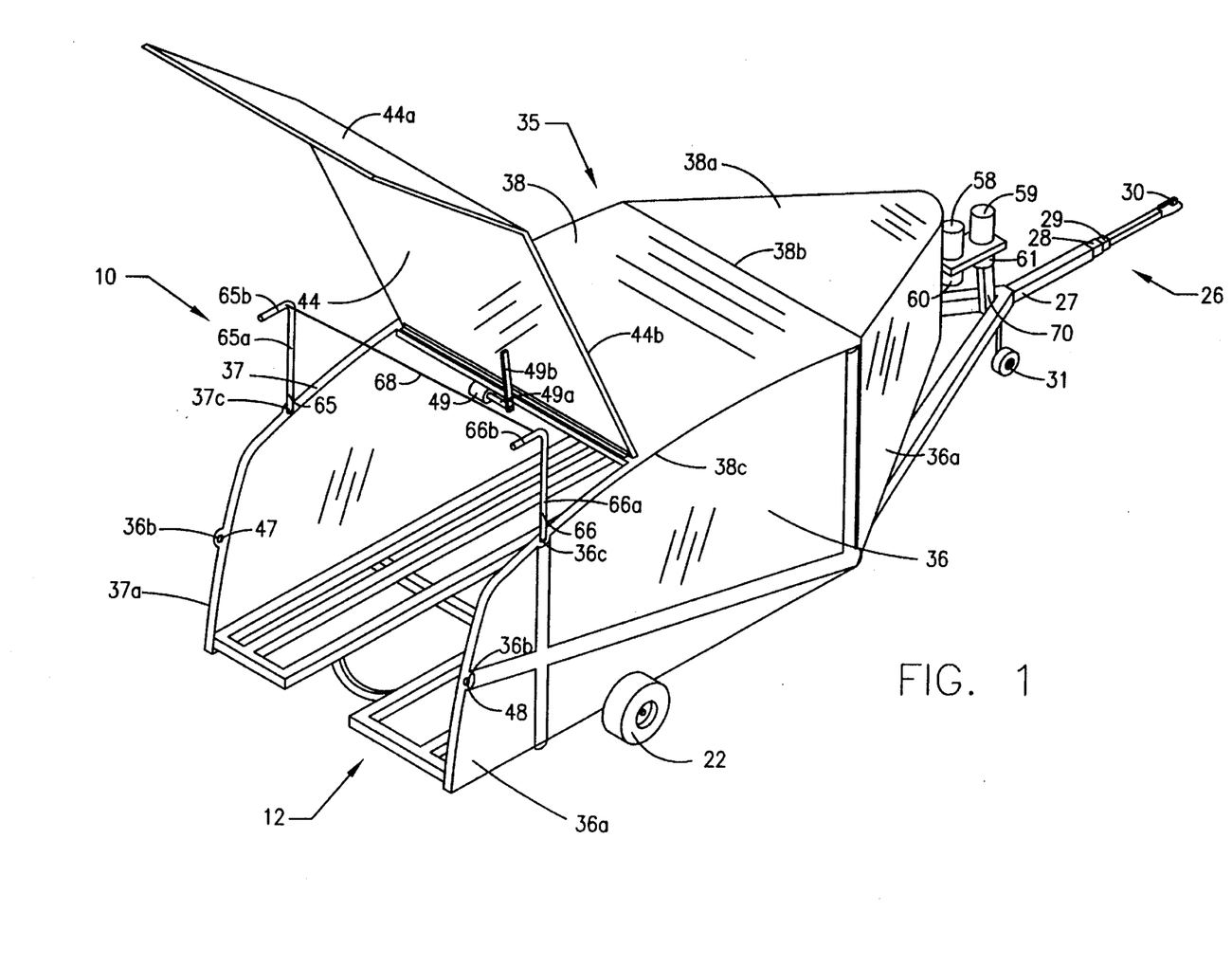
FIG. 1 is a top perspective view of the universal covered trailer with the door in an open position.
Figure 2:
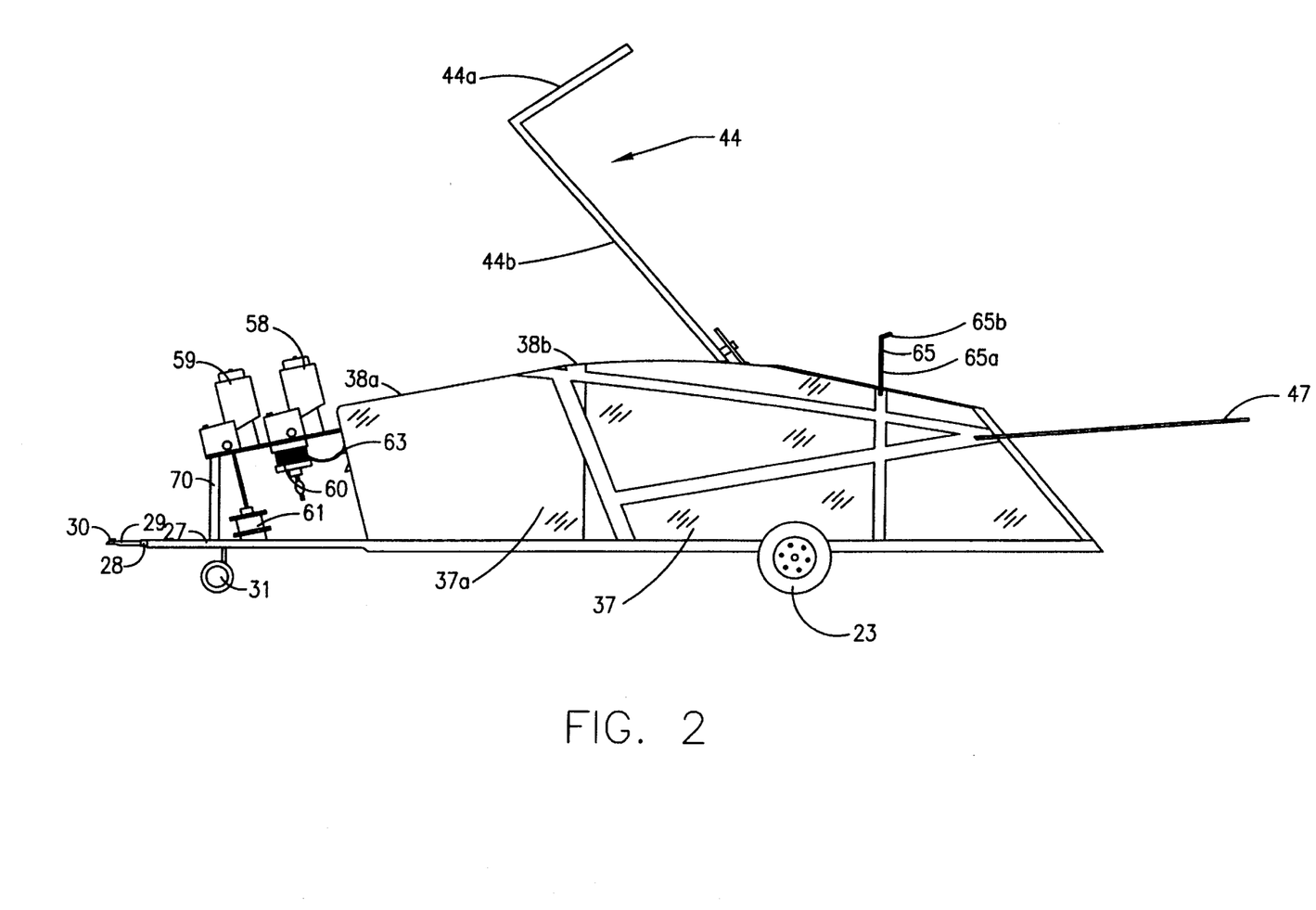
FIG. 2 is side elevation view of the universal covered trailer with the guide rails extended from the rear of the housing member and with the tongue means in a retracted transport position.
Figure 3:
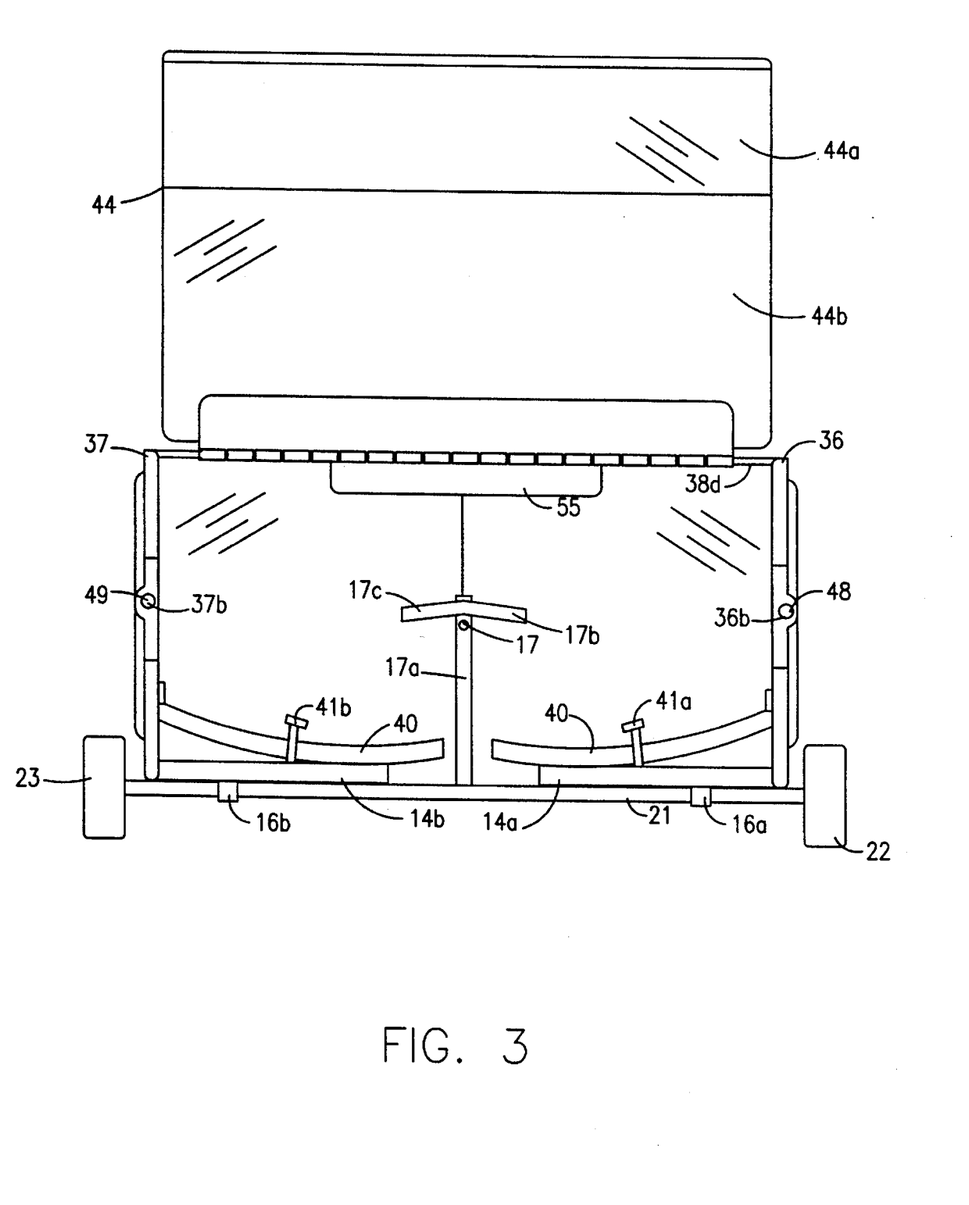
FIG. 3 is a rear elevation view of the universal covered trailer with the guide rails retracted in the rear of the housing member.
Figure 4:
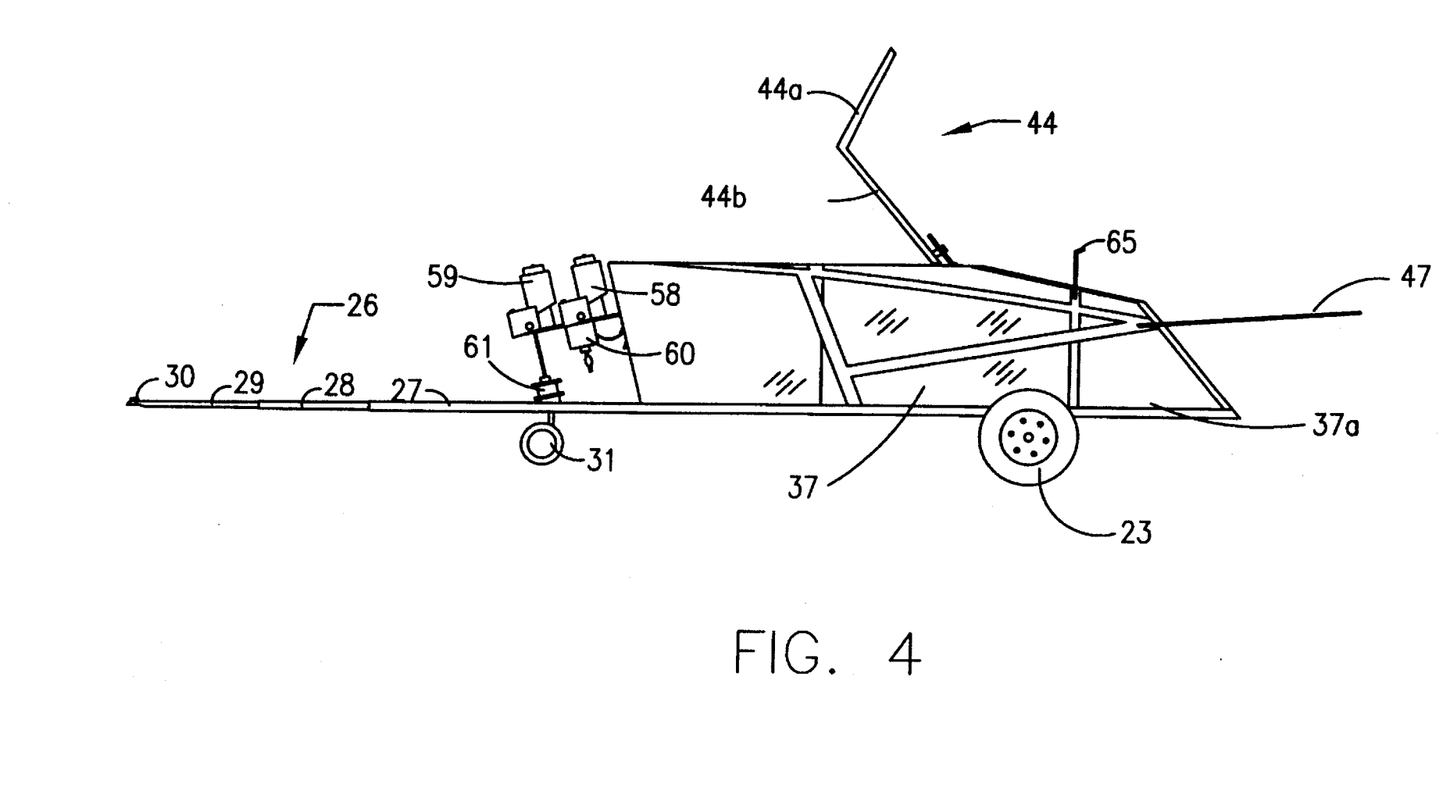
FIG. 4 is a side elevation view of the universal covered trailer with the tongue means in an extended lockable position and the wall stabilizing members in a vertically extended position.
Figure 5:
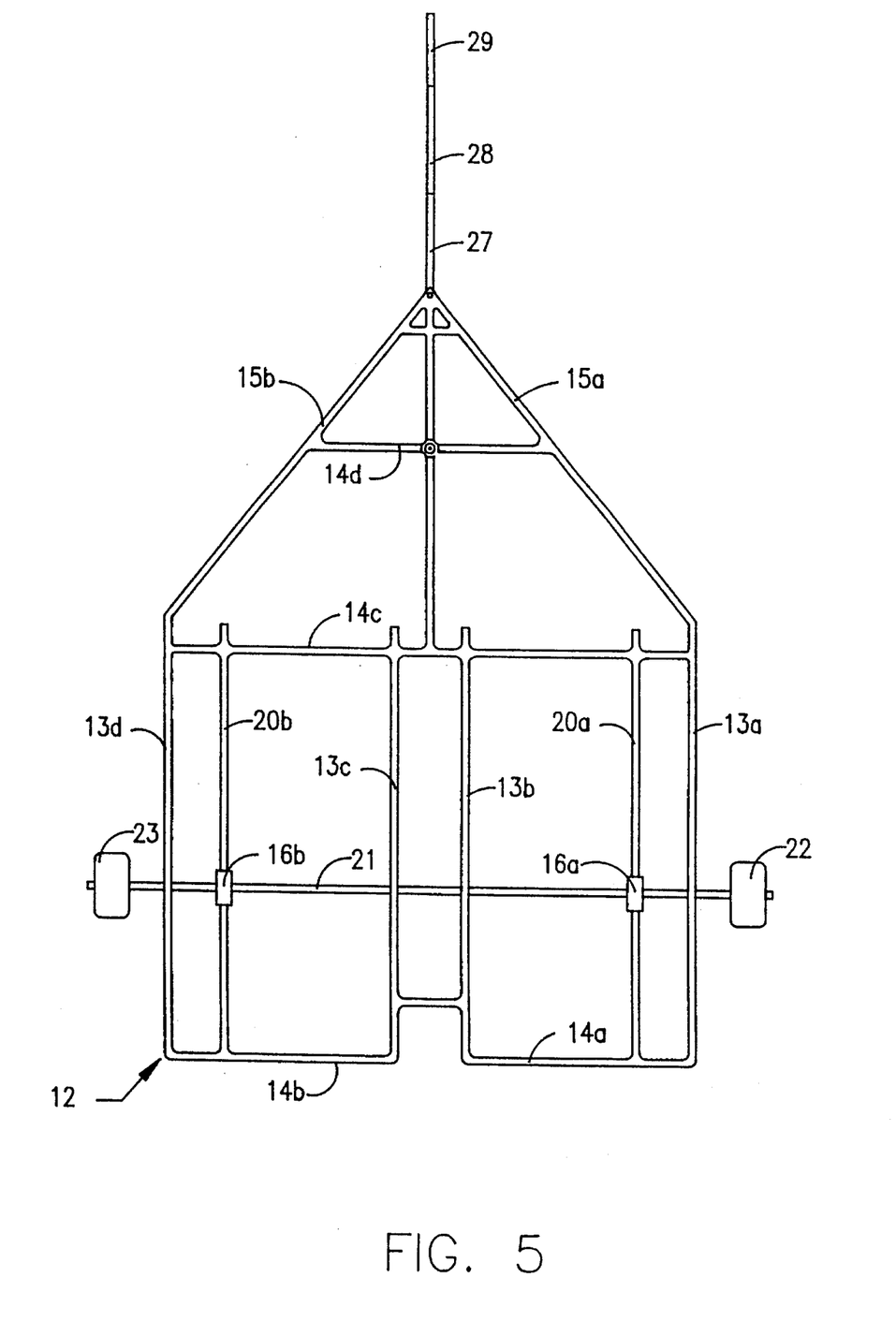
FIG. 5 is a top plan view of the frame of the universal covered trailer showing in particular the axle slidably mounted to the frame.
Figure 6:
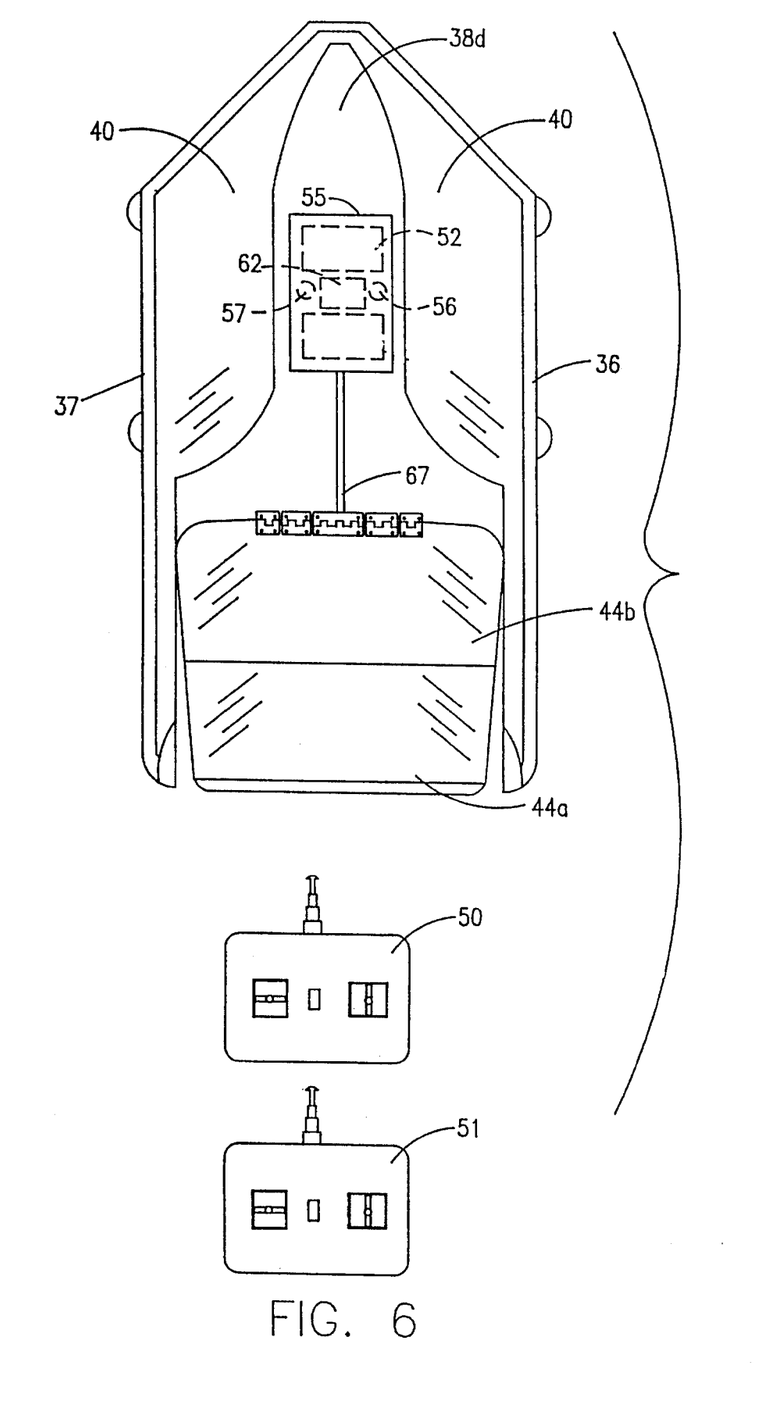
FIG. 6 is a bottom plan view of the housing member of the universal covered trailer.
Figure 7:
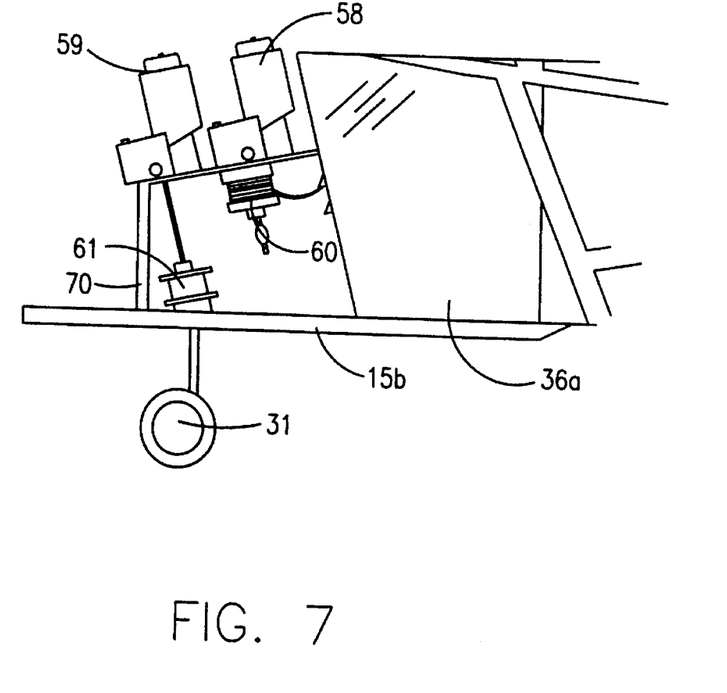
FIG. 7 is a detailed side view of the front end of the housing member including the tongue means showing in particular the actuating means to retract the tongue means by radio remote control.
Figure 8:
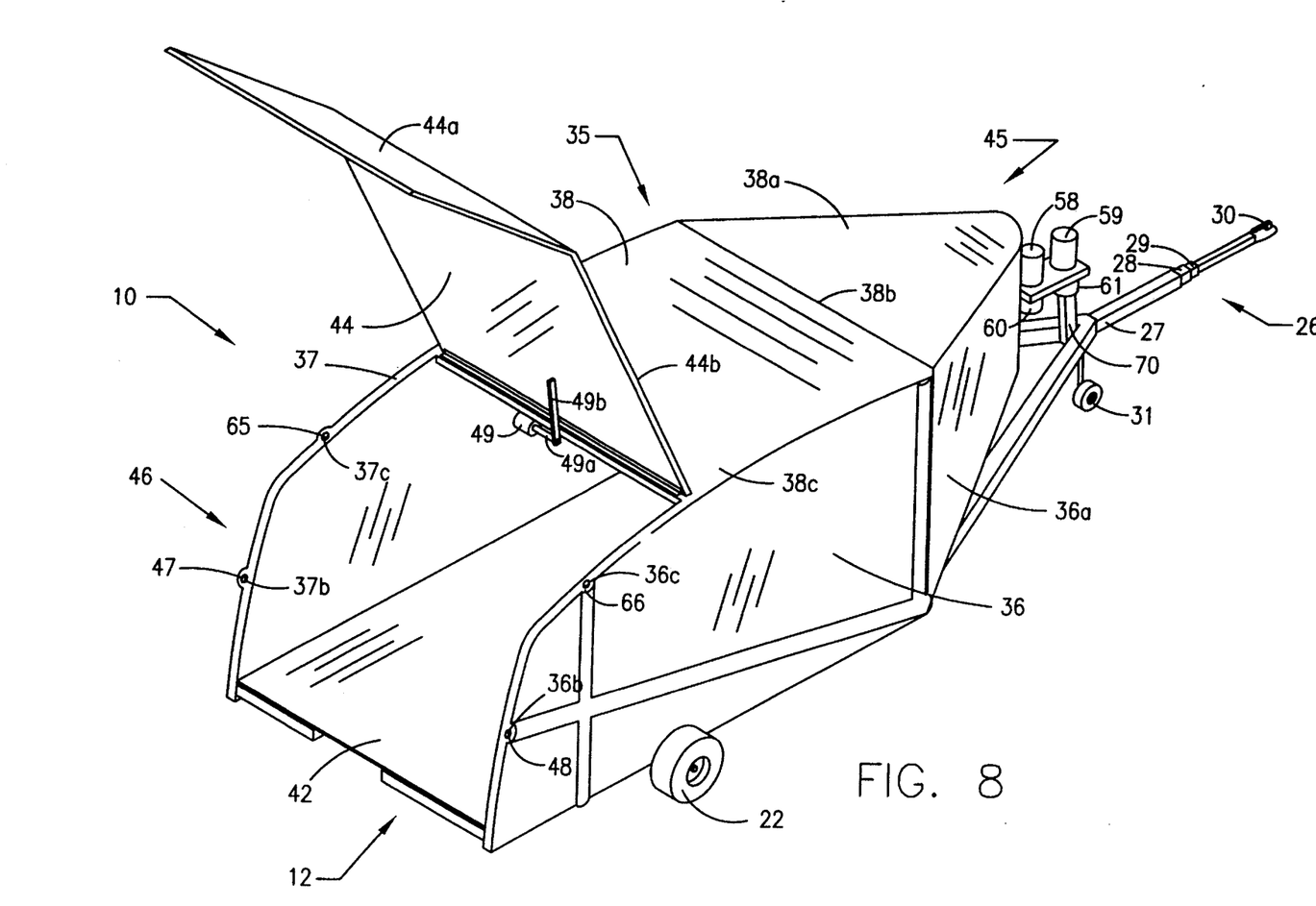
FIG. 8 is a rear perspective view of the universal covered trailer showing in particular the removable floor inserted in the housing member.
Figure 9:
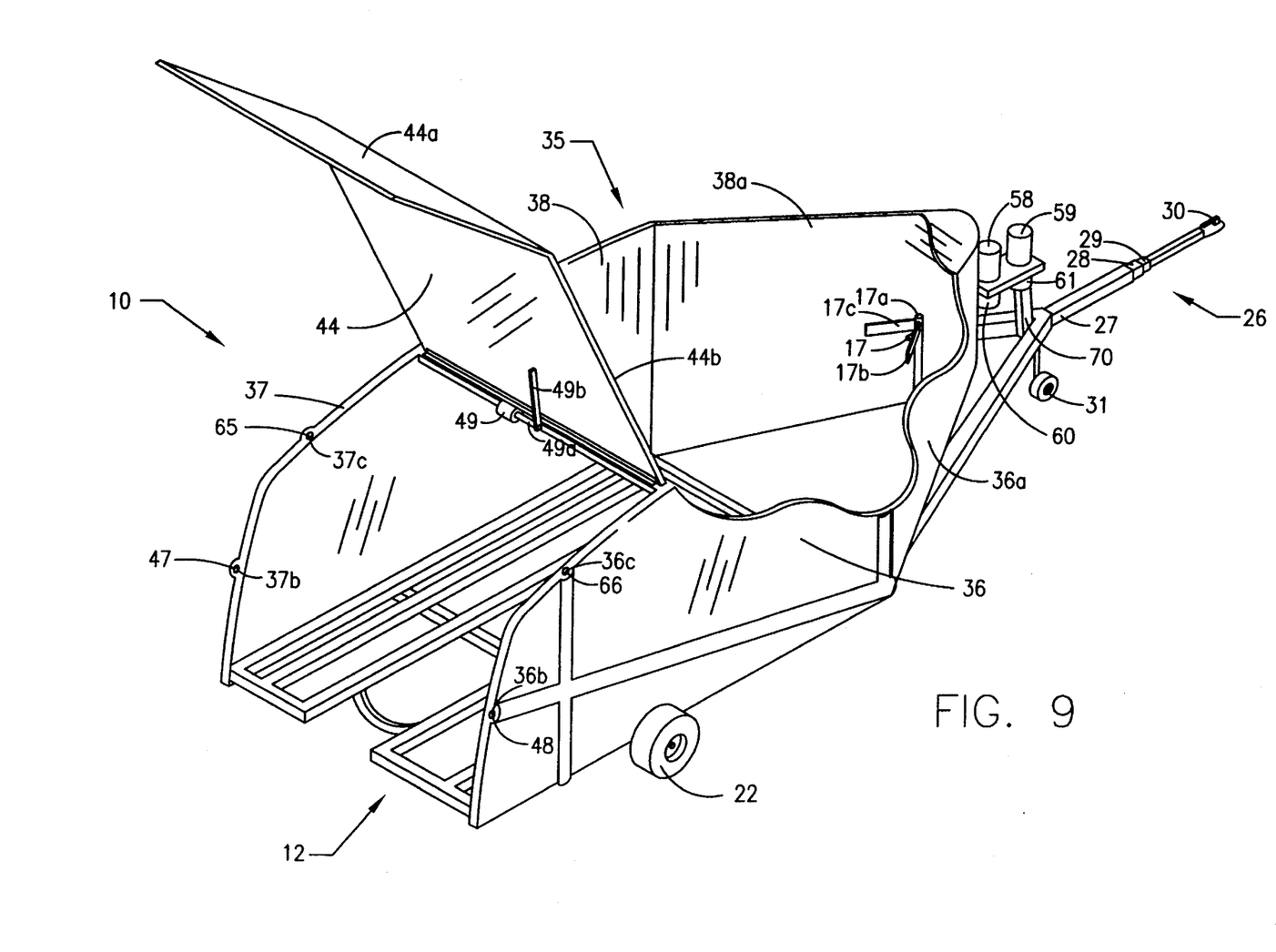
FIG. 9 is a cutaway perspective view of the universal covered trailer showing the boat mooring means to secure the boat inside the trailer.
Figure 10:
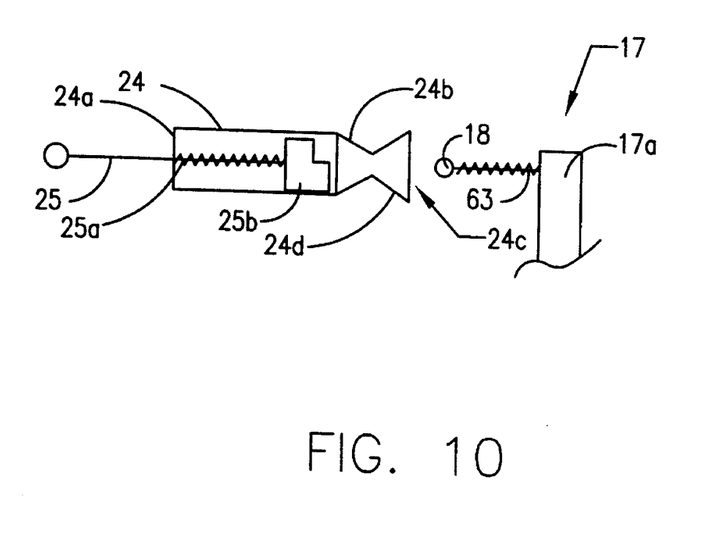
FIG. 10 is a detail view of the boat mooring means which secures the boat inside the trailer and a detail view of the means to secure the boat to the boat mooring means.

As shown in FIGS. 3, 9, & 10, a boat mooring means 17 is mounted upon the frame 12 to secure a boat on the trailer and comprises a post member 17a fixedly attached upon a cross member 14d near the front of the frame 12, a pair of guide arms 17b–c fixedly attached to the top of the post member 17a and generally disposed parallel to the frame and angled from one another and extending toward the rear of the frame 12 and adapted and spaced from one another to receive a portion of the bow of the boat, and a connecting means connected to the end of the first cable 63 for securing the boat and comprising a connector 18 having a generally rounded end which is adapted and dimensioned to move into a tubular member 24 having a bore 24a therethrough, the bore 24a having a constricted or narrowed portion 24b near the front end 24c of the tubular member 24 and further having an outwardly tapered front portion 24d for receiving the rounded end of the connector 18. The tubular member 24 is moveably connected to the bow of the boat. A hold member 25b moveably extends in the bore 24a of the tubular member 24, is attached to the end of a flexible release mechanism 25, and is biased with a spring member 25a toward and engageable to the constricted portion 24b to releaseably engage the rounded end of the connector 18 in the bore 24a of the tubular member 24, the hold member 25b having a generally L-shaped longitudinal cross-section with the inside angle of the L-shaped hold member facing the front end 24c of the bore 24a. The connector 18 is insertable through the front end 24c of the tubular member 24 with the rounded end capable of extending beyond the constricted portion 24b. To lock or secure the connector 18 in the tubular member 24, the user can insert the rounded end of the connector 18 into the tubular member 24 until the rounded end engages the hold member 25b on the inside angle thereof and the constricted portion 24b. To release the connector 18, the user simply urges the release mechanism 25 away from the constricted portion 24b of the bore 24a, which moves the hold member 25b away from the constricted portion 24b thus releasing the connector 18.

As shown in FIG. 3, a pair of conventional pivotable boat supports 41a–b are mounted upon the frame 12 near the rear thereof and spaced apart from one another to support and balance the boat upon the frame 12. A conventional tongue support wheel means 31 is fixedly attached to the articulated joint of the converging members 15a–b and the tongue means 26 and extends downwardly therefrom in a ground engageable position for supporting the front of the trailer 10 and the tongue means 26. The conventional tongue support wheel means 31 comprises a depending shaft member and a stub axle at the bottom of the depending shaft member with a wheel rotatably attached thereto for rolling upon the ground.

As shown in FIGS. 1–4, 6, 8–9, the covered trailer 10 further comprises a housing 35 comprising a top wall 38 having a crest 38b intermediately disposed thereupon, a forward portion 38a sloping or slanting downwardly and forwardly from the crest 38b, and a rearward portion 38c slanting downwardly and rearwardly from the crest 38b; two side walls 36 & 37 each having a forward portion 36a & 37a slanting inwardly and attached to the other side wall 36 & 37 at the front of the frame 12, each side wall 36 & 37 being longitudinally bowed outwardly above the wheels 22 & 23 of the trailer 10; a generally open bottom 40 with a removable floor 42 mountable in the bottom of the housing 35 and capable of carrying and storing movable objects; and a door 44 openingly and closingly attached at an end thereof to the rearward portion 38c of the top wall 38 and having a lower portion 44a generally angled relative to the upper portion 44b of the door 44 and adapted to close over the rear 46 of the housing 35 to enclose the boat or other movable objects loaded into the trailer 10. A servomotor 49 is connected to a four channel radio receiver 52 via wires (not shown) and comprises a rotatable shaft 49a connected to an end of an arm 49b with the other end of the arm 49b being attached to the underside of the door 44 for opening and closing of the door 44 with a remote radio transmitter. Two wall stabilizing members 65 & 66 are extensive from and retractable in slots 36c & 37c in the top edges of the two side walls 36 & 37 near the rear of the housing 35 for stabilizing the side walls 36 & 37 during the loading and unloading of a boat from the trailer 10, each wall stabilizing member 65 & 66 comprising a rod member 65a & 66a slidably disposed in the respective slot 36c & 37c, a cross piece 65b & 66b fixedly attached and disposed perpendicular to a top end of the rod member 65a & 66a, and a detent (not shown) at the bottom ends of the rod members to prevent the rod members 65a & 66a from coming completely out of the slots 36c & 37c. The cross pieces 65b & 66b are adapted to either engage each other above the trailer 10 and above any boat being loaded into or unloaded from the trailer 10 or restrain a flexible line 68 tightly drawn between the two wall stabilizing members 65 & 66 to restrain the side walls 36 & 37 so that they do not wobble back and forth while the boat is being loaded into or unloaded from the trailer 10. The wall stabilizing members 65 & 66 are extended to either load or unload the boat and then are retracted into the slots 36c & 37c thereafter in a nonoperable storage position.

The housing 35 is fixedly mounted upon the frame 12 with fasteners such as bolts or the like. The housing 35 is generally structured similar to that of a boat with the front 45 of the housing 35 being streamlined to substantially reduce drag on the trailer 10 effected by the air as the trailer 10 is moved. A pair of retractable elongate boat guide rails or guide members 47 & 48 are slidably mounted in slots in the rear edge of the side walls 36 & 37 of the housing 35. The elongate boat guide members 47 & 48 have stops (not shown) at the forward ends thereof to hold the guide members 47 & 48 in the slots 47a & 48a so that they cannot be completely removed from the housing 35 when the guide members 47 & 48 are extended from the rear edge of the side walls 36 & 37. When extended from the side walls 37 & 37, the guide members 47 & 48 are spaced from one another and are adapted to allow a boat therebetween to guide and channel the boat into the trailer 10. Once the boat has been loaded, the guide members 47 & 48 should then be retracted into the slots 47a & 48a of the side walls 36 & 37 in nonoperable positions.

As shown in FIGS. 1, 2, 4, 8 & 9, the covered trailer 10 also comprises a means for loading the boat into the trailer 10 and launching the boat from the trailer 10. The means comprises a first motor 58 such as a servomotor having a rotatable shaft, a reel 60 fixedly attached to the end of the shaft for rotation therewith, a first cable 63 wound about the reel 60 and carried by the boat mooring means 17 for connecting to the bow of the boat to draw the boat into the trailer 10 and also to let out the boat from the trailer 10, a power supply means 62 such as a battery which is securely mounted with brackets 55 as such to the underside 38d of the top wall 38 near the front 45 of the housing 35, a first switch 56 also fixedly attached to the underside 38d of the top wall 38 near the front of the housing 35 and connected to the power supply means 62 for energizing the first motor 58 which actuates the rotation of the reel 60 to either let out or take up the first cable 63, a four channel radio receiver 52 which is fixedly attached with brackets 55 to the underside 38d of the top wall 38 near the front 45 of the housing 35 and which is connected with wires (not shown) to the first switch 56, and a first handheld radio transmitter 50 for generating and amplifying a radio-frequency carrier signal and modulating the carrier signal with intelligence and feeding the modulated carrier to an antenna for transmitting as electromagnetic waves to a receiving antenna 67 which is wired to the radio receiver 52 to receive the radio transmitted waves. The means allows the user to launch the boat from inside the boat by activating the first radio transmitter 50 to send radio waves to the radio receiver 52 via the receiving antenna 67, which turns on the first switch 56 which energizes the first motor 58 which actuates the shaft and reel 60. The reel 60 can be rotated in one direction to let out the first cable 63 and rotated in the opposite direction to take up the first cable 63. The user can conveniently control the letting out and taking up of the first cable 63 by manipulating the controls on the first radio transmitter 50 without the user having to manually turn a crank such as on a conventional winch, and the user can do all of this while he/she is inside of the boat and not wading in the water.

To load and secure the boat onto the trailer 10, the user should extend the retractable guide members 47 & 48 from the rear 46 of the housing 35, extend and secure the wall stabilizing members 65 & 66 with a flexible cord drawn between them, and connect the first cable 63 to the bow of the boat and then activate the first radio transmitter 50 which sends a radio wave to the radio receiver 52 which in turn signals the first switch 56 which energizes the first motor 58 which actuates the shaft and reel 60 which urges the first cable 63 to wind around the reel 60 thus drawing the boat into the housing 35 and upon the frame 12.

As shown in FIGS. 1, 2, 4, 8 & 9, the covered trailer 10 also includes a control means to retract the extension tongue sections 26 within the anchor section 27, which comprises a second motor means 59 such as a servomotor having a rotatable shaft and being mounted upon the frame 12 with brackets and bolts as such; a spool 61 having a second cable 64 wound thereabout and being fixedly attached to the end of the shaft for rotation therewith, the second cable 64 extending through the tubular sections 27–29 of the tongue means 26 and being attached to the extension sections 28 & 29 to retract the extension sections 28 & 29 of the tongue means 26 into the anchor section 27; a second switch means 57 fixedly attached to the underside 38d of the top wall 38 near the front 45 of the housing 35 to energize the second motor means 59; the radio receiver 52 connected to the switch 57 via wires and to the receiving antenna 67 to receive radio transmitted waves. The means allows the user to retract the tubular extension sections 28 & 29 of the tongue means 26 inside the anchor section 27 and without the user having to manually turn a crank as on a conventional winch to retract the extension sections 28 & 29 of the tongue means 26. The second remote control means saves the user time and energy and also substantially reduces any possibility of back injury to the user since the user does not have to turn a crank to retract the tongue means 26.

Another feature of the universal covered trailer includes a removable floor 42 which is made of preferably a plastic material and is dimensioned and adapted to fit upon a flange (not shown) which extends inwardly from the bottom edges of the side walls 36 & 37. The removable floor 42 has a tapered forward portion and can be easily removed from the bottom of the housing 35 and is capable of supporting movable objects of most any weight. The universal covered trailer 10 with the floor 42 disposed on the bottom of the housing 35 allows the user to carry and transport many different movable objects and could be used as a moving trailer 10 to carry and transport the personal belongings of the user. To insert and remove the floor 42, the user slides the floor 42 through the rear 46 of the housing 35. If the user wants to use the covered trailer 10 to transport and store his/her boat, the user can conveniently slide the floor 42 out the rear 46 of the housing 35, and the trailer 10 will be ready to receive the boat. Also, another feature of the trailer 10 is a protective shield (not shown) which has a tapered forward portions and is adapted to be removeably disposed on the bottom of the housing 35 at the front of the frame 12. The protective shield is contoured to shroud over the exposed portion of the bottom bow of the boat to protect the boat from being pelted and chipped with road debris being kicked up by the tires of the prime mover.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A universal covered trailer comprising:

a frame having a plurality of longitudinal members and a plurality of cross members fixedly interconnecting said longitudinal members, for supporting a boat or other movable objects;

at least one wheeled axle;

a tongue means having a plurality of tubular sections, at least one of which is conventionally extendable and retractable within at least one other of said tubular sections for connecting to a prime mover, said tongue means fixedly attached to and extending forward of said frame;

a housing member having a top wall, two side walls and a bottom, each of said side walls having a forward portion which is tapered inwardly and attached forwardly to said other side wall, said housing member further having a door adapted to close over a back of said housing member, said housing member also having a pair of wall stabilizing members extendably disposed in slots in said side walls to substantially prevent said side walls from wobbling during the loading and unloading of the boat, said wall stabilizing members being extendable from and retractable in said slots in top edges of said side walls near a rear of said housing, each of said wall stabilizing members having a rod member and a cross piece fixedly attached to a top end of said rod member, said rod members being extendable from said slots with a flexible line being tightly drawn to and between said rod members to stabilize said side walls;

a means to load said boat into said trailer, and a means to retract said extendable tubular sections of said tongue means.

2. A universal covered trailer comprising:

a frame having a plurality of longitudinal members and a plurality of cross members fixedly interconnecting said longitudinal members, for supporting a boat or other movable objects; said frame also having a mooring means comprising a post member fixedly disposed upright upon said frame, a pair of guide arms fixedly attached to said post member and angled relative to one another, and a connecting means for securely docking said boat in said trailer, said mooring means further including a connecting means comprising a connector having a generally rounded end for detachably securing said boat, said mooring means also including a tubular member having a bore therethrough, and including a hold member movably biased in said tubular member, said hold member being engageable to said round end of said connector to hold and secure said boat;

at least one wheeled axle;

a tongue means having a plurality of tubular sections, at least one of which is conventionally extendable and retractable within at least one other of said tubular sections for connecting to a prime mover, said tongue means fixedly attached to and extending forward of said frame;

a housing member having a top wall, two side walls and a bottom, each of said side walls having a forward portion which is tapered inwardly and attached forwardly to said other side wall, said housing member further having a door adapted to close over a back of said housing member;

a means to load said boat into said trailer, and a means to retract said extendable tubular sections of said tongue means.

3. A universal covered trailer as described in claim 2, wherein said mooring means further includes said tubular member having said bore which has a tapered front end and a constricted portion near said front end, said hold member biasedly engaged in said constricted portion.

4. A universal covered trailer as described in claim 3, wherein said hold member has a generally L-shaped longitudinal cross-section and has an inside angle which faces said constricted portion, said connector engageable in said bore between said constricted portion and said hold member for securing said boat.

* * * * *